Sept. 13, 1966 J. J. M. SCHOENMAKERS 3,272,325

STORAGE CASE FOR A TAPE CARTRIDGE

Filed April 13, 1965 3 Sheets-Sheet 1

INVENTOR.
JOHANNES J.M. SCHOENMAKERS
BY
Frank R. Jifari
AGENT

Sept. 13, 1966 J. J. M. SCHOENMAKERS 3,272,325

STORAGE CASE FOR A TAPE CARTRIDGE

Filed April 13, 1965 3 Sheets-Sheet 2

INVENTOR.
JOHANNES J.M.SCHOENMAKERS
BY
Frank R. Trifari
AGENT

INVENTOR.
JOHANNES J.M.SCHOENMAKERS
BY
Frank R. Jinfani
AGENT

United States Patent Office 3,272,325

Patented Sept. 13, 1966

3,272,325
STORAGE CASE FOR A TAPE CARTRIDGE

Johannes Jozeph Martinus Schoenmakers, Emmasingel, Eindhoven, Netherlands, assignor to North American Philips Company, Inc., New York, N.Y., a corporation of Delaware Filed Apr. 13, 1965, Ser. No. 447,770
Claims priority, application Netherlands, Apr. 15, 1964, 6,404,046
2 Claims. (Cl. 206—52)

The invention disclosed herein relates to a storage case for a cartridge or cassette of film, magnetic tape or the like. Known cases of this type provide sufficient protection against mechanical damage, however when the tape supply reel of the cartridge is not fixed in the storage case, sometimes the tape starts unwinding as a result of shocks occurring during transport. The tape then becomes loose in the case and as a result of this, the loose tape may be damaged.

The invention has for its object to provide a storage case having locking means which prevent movement of the tape in the cartridge and in which the locking means is operative only when the case is closed and is automatically rendered inoperative when the case is opened for removal of the cartridge. In addition, an object of the invention is to provide a storage case from which the cartridge is easily accessible for quick removal.

Briefly, the case according to the invention comprises a stationary part having the locking means and including a bottom and side walls, and a relatively moveable part in the form of a pouch which contains the cartridge. The pouch-like part is moved into and out of the stationary part to close and open the case, and lock and unlock the reels of the cartridge.

According to the present embodiment, a storage case for a magnetic tape cartridge is shown according to the invention in which the pouch-like part is pivotally mounted on the stationary part and one wall of the pouch fits into a cut-out of the corresponding wall of the stationary part and the opposite wall of the pouch forms the whole lid of the case. In this manner an extremely simple and practical storage case is obtained. A separate cover is not necessary.

The above and other features, objects and advantages of the present invention will be fully understood from the following description considered in connection with the accompanying illustrative drawings.

Figure 6:
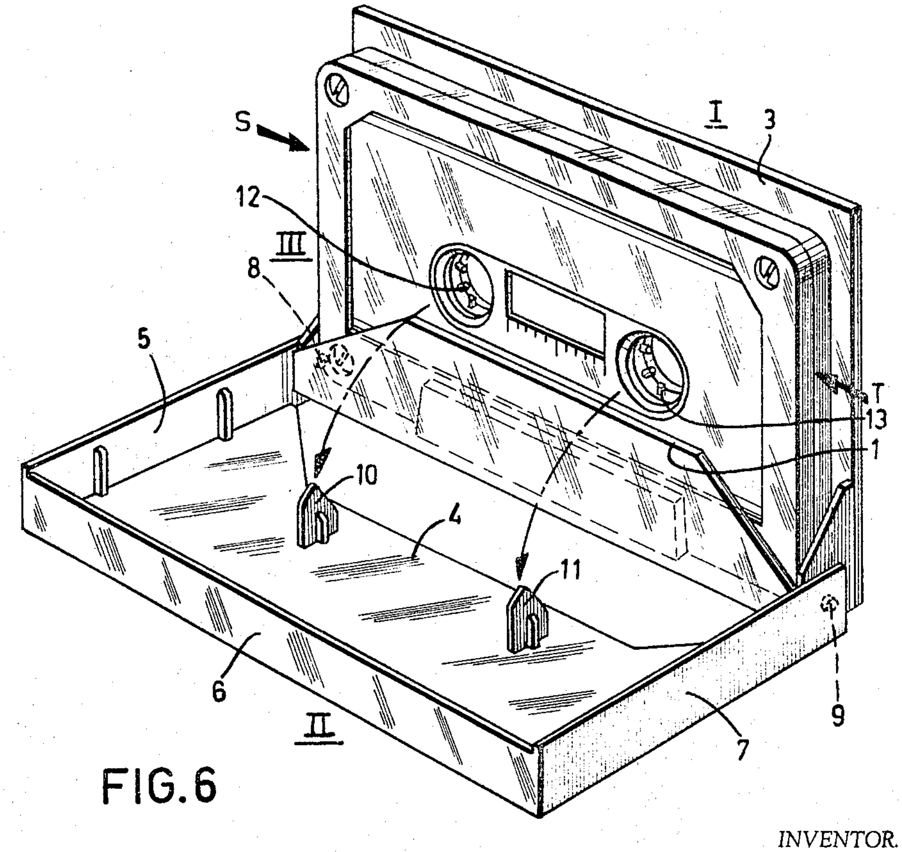

FIG. 6 is a view of the cartridge shown in place in the opened case. The arcs of circles indicate how, when the case is closed, the tape reels within the cartridge engage the projections on the fixed bottom portion and, as a result, the reels are locked with respect to the cartridge. This figure also shows that when the case is opened, the holder is supported in the pouch of the lid.

Figure 1:
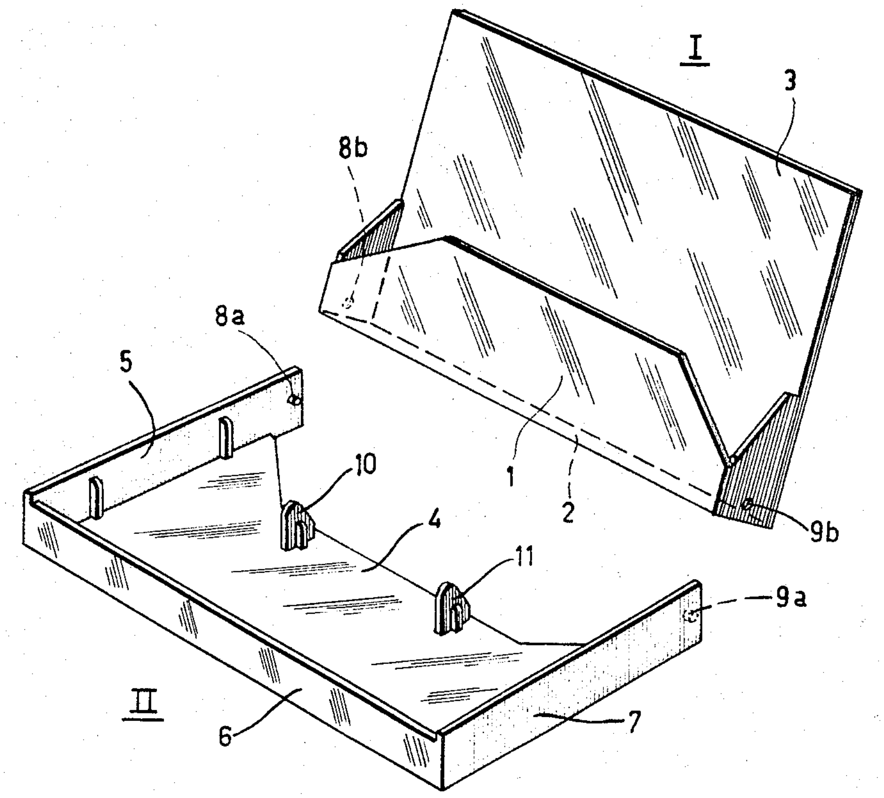
FIG. 1 is a perspective view of a storage container in which the two halves of the case are separated.
Figures 2, 3, 4:
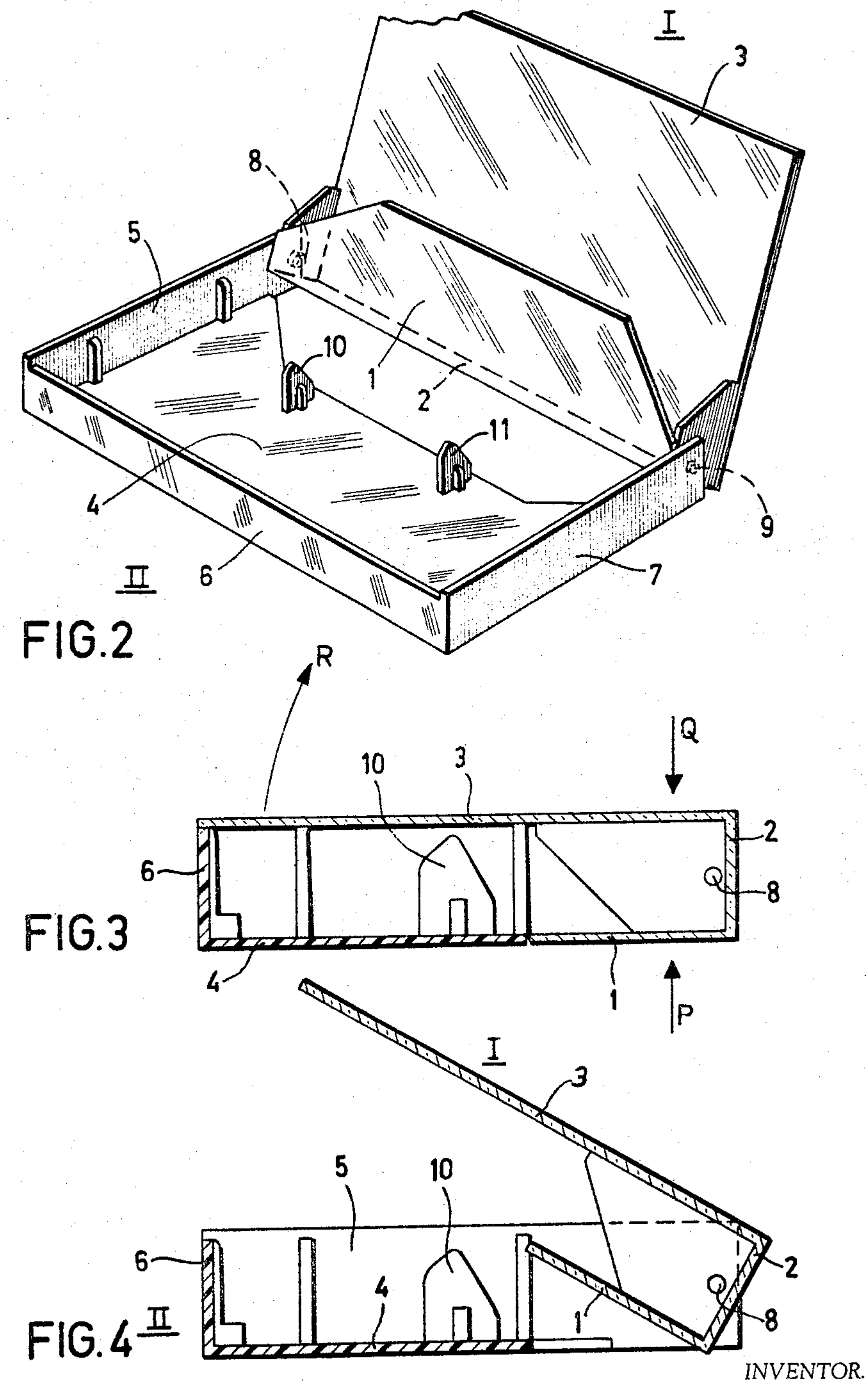
FIG. 2 is a perspective view similar to FIG. 1 in which the two halves of the case are shown assembled.
FIGS. 3 and 4 are cross sectional views of the case taken on a plane at right angles to the axis of the pivots which connect the upper and lower part of the case in the closed and opened position.
Figure 5:
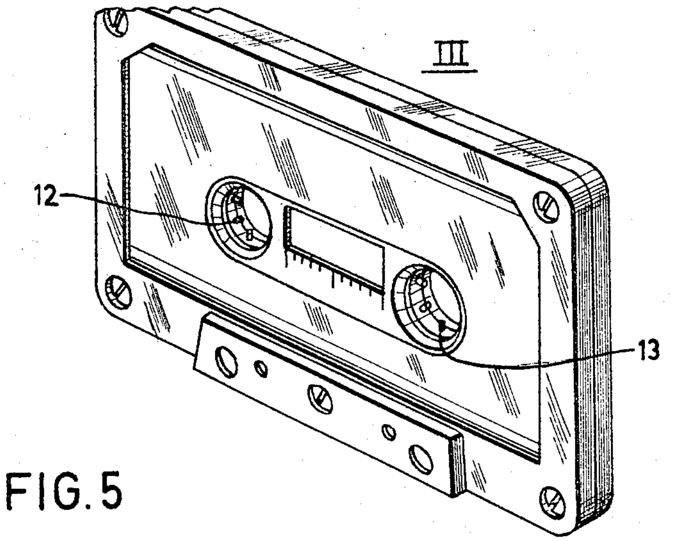
FIG. 5 is a view of tape cartridge to be stored in the case.

Referring to the drawing, a storage case consisting of synthetic material comprises two parts, I and II, FIGS. 1 and 2. Part I of the storage case forms a pouch-like member defined by walls 1, 2 and 3 and the interconnecting end walls as shown in the figure. The wall 3 forms the lid for the storage case when the pouch part is moved into closed position (FIG. 3). The part II of the storage case has three upstanding side walls, 5, 6, 7 and a bottom wall 4 which is relieved or cut away so that wall 1 of the lid will lie in the relief and thus in the plane of the wall 4 when the case is closed. The wall 1 of the part I therefore becomes a portion of the bottom wall of the case when it is closed (FIG. 3). The other portion of the bottom wall is wall 4 of part II. The parts I and II are connected together by pivots 8 and 9 consisting of pins 8*a*, 9*a* in the walls 5 and 7 respectively of Part II. The pins 8*a*, 9*a* fit within apertures 8*b*, 9*b* of part I as shown. Since the portions of walls 5 and 7 containing projections 8*a*, 9*a* are unsupported these portions can be flexed slightly to join and separate the parts I and II by withdrawing these pins from the associated apertures. Two projections, or lugs, 10 and 11, are provided on the fixed bottom wall portion 4. When the pouch is in the closed position, these lugs 10 and 11 engage the inner toothings 12 and 13 on the two reels (not shown) in the cartridge III. (FIGS. 5 and 6.) As a result of this, the reels can not rotates with respect to the cartridge and unwinding of the tape is prevented when the case is closed. The tape runs from the reel with the inner teeth 12 along the lower side of the pouch as illustrated in FIGURE 5 to the reel in the cartridge which is provided with inner teeth 13. When the cartridge is to be taken out of the case, the lid 3, as shown in FIG. 3, and the partial bottom wall portion 1 are taken between thumb and forefinger as indicated by the arrows P and Q and turned about the pivots 8 and 9 in the direction of the arrow R with respect to the remaining part of the case. As a result of this the cartridge reels are released from the lugs 10 and 11 and the cartridge is lifted out of the relatively stationary part of the case while it is being held between the movable bottom portion 1 and the lid 3. Now the cartridge may be grasped by the sides as indicated in FIG. 6 by arrows S and T and removed from the case. Also, the cartridge may be inspected for a great part when the case is opened without removal from the case.

In the embodiment shown, the storage case is constructed for receiving a cartridge with two reels. It will be clear, however, in accordance with the above disclosure that a case may be made for receiving a holder with one core. In that case the fixed bottom portion has only one projection.

It will be seen from FIGS. 3 and 4 that the pouch part I of the case may have walls 1 and 3 which are identical and the part II of the case may have two spaced parallel walls 4 so that the pouch slides into the stationary part II of the case. Such a modification is contemplated as useful for a storage case for a spool of tape, i.e. a reel without a housing or cartridge. To prevent the tape from loosening on the reel, one or more of the walls 5, 6, 7 may be provided with a leaf spring extending into the interior of part II for holding the tape against loosening. Alternatively, the leaf spring may be provided on the pouch in a similar manner.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed to be new and useful and secured by Letters Patent of the United States is:

1. The combination of a magnetic tape cartridge and storage container therefor comprising a first open receptacle container portion having a pair of side walls of equal length, an end wall connected with each said side wall at one end thereof, a bottom wall connected with said end wall and said side walls at one edge thereof, said bottom wall extending for only a portion of the length of said side walls defining a cut-away in said first receptacle portion whereby said side walls extend freely beyond said bottom wall; a second container portion comprising a lid wall substantially overlying said side walls over the entire length thereof in the closed position of said first and second container portions, a configured wall in spaced substantially parallel relation with said lid wall, said configured wall having the same shape as said cut-away and being dimensioned for closely fitting within said cut-away in the said closed position, additional lid wall means connected with both said lid wall and configured wall at the aligned edges thereof defining a pouch; a tape cartridge containing at leas one tape reel, said cartridge positioned in said pouch, a major portion of said cartridge projecting beyond said configured wall, means hingedly connecting said first and second container portions for pivotal movement about an axis intersecting said side walls of said receptacle portion at the free ends thereof and passing through said pouch; and fixed means in said first open receptacle container portion locking said reel against rotation within said cartridge in the said closed position of the container portions.

2. The combination according to claim 1 wherein said cartridge has an opening therein exposing the hub of said reel, said last named fixed means for locking said reel against rotation comprising an upstanding fixed lug connected with said bottom wall adjacent said cut-away, said lug being positioned and arranged for entering said opening and engaging said hub whereby said reel is locked against rotation within said cartridge.

References Cited by the Examiner

UNITED STATES PATENTS

| | | | |
|---|---|---|---|
| 913,054 | 3/1909 | Robbins. | |
| 1,048,285 | 12/1912 | Brand. | |
| 1,574,566 | 3/1926 | Fiske | 206—41 |
| 2,374,346 | 4/1945 | Hablf. | |
| 2,399,470 | 4/1946 | Crane | 206—41 |
| 3,220,787 | 11/1965 | Latos | 242—55.13 |

LOUIS G. MANCENE, *Primary Examiner.*